Sept. 8, 1959  R. H. FROST ET AL  2,902,861
PRESSURE SENSING DEVICE
Filed March 9, 1955  2 Sheets-Sheet 1
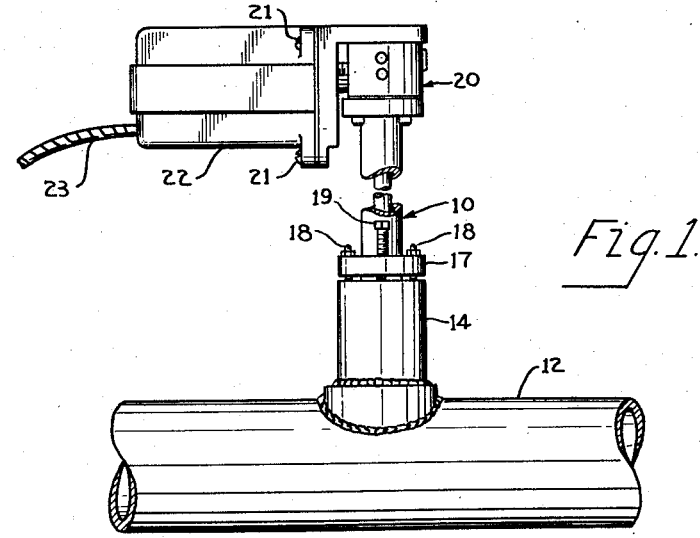
Fig. 1.
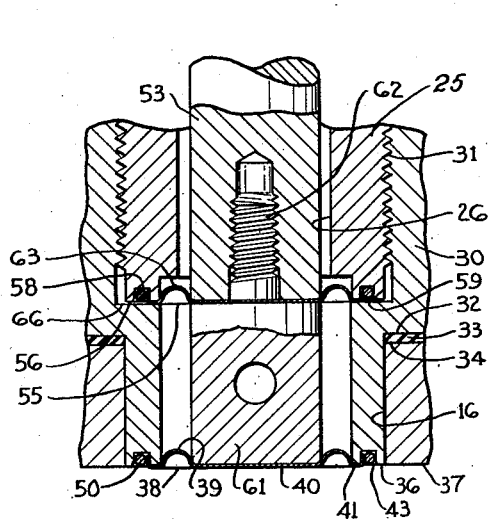
Fig. 4.
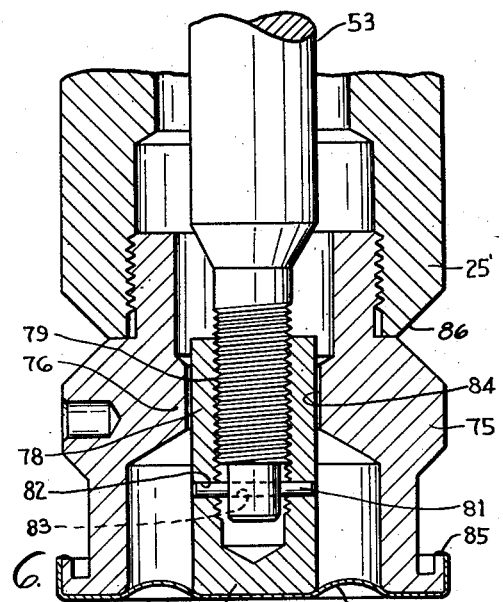
Fig. 6.
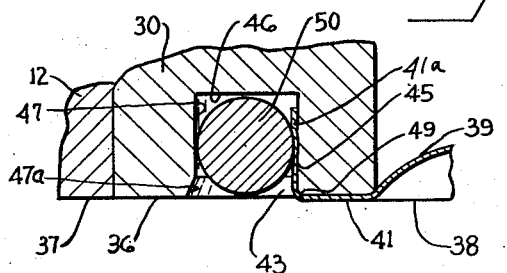
Fig. 5.
Fig. 7.
INVENTORS
RICHARD H. FROST
EARL O. SCHWEITZER
BY Bosworth, Sessions, Herrstrom
& Lawlor
ATTORNEYS.

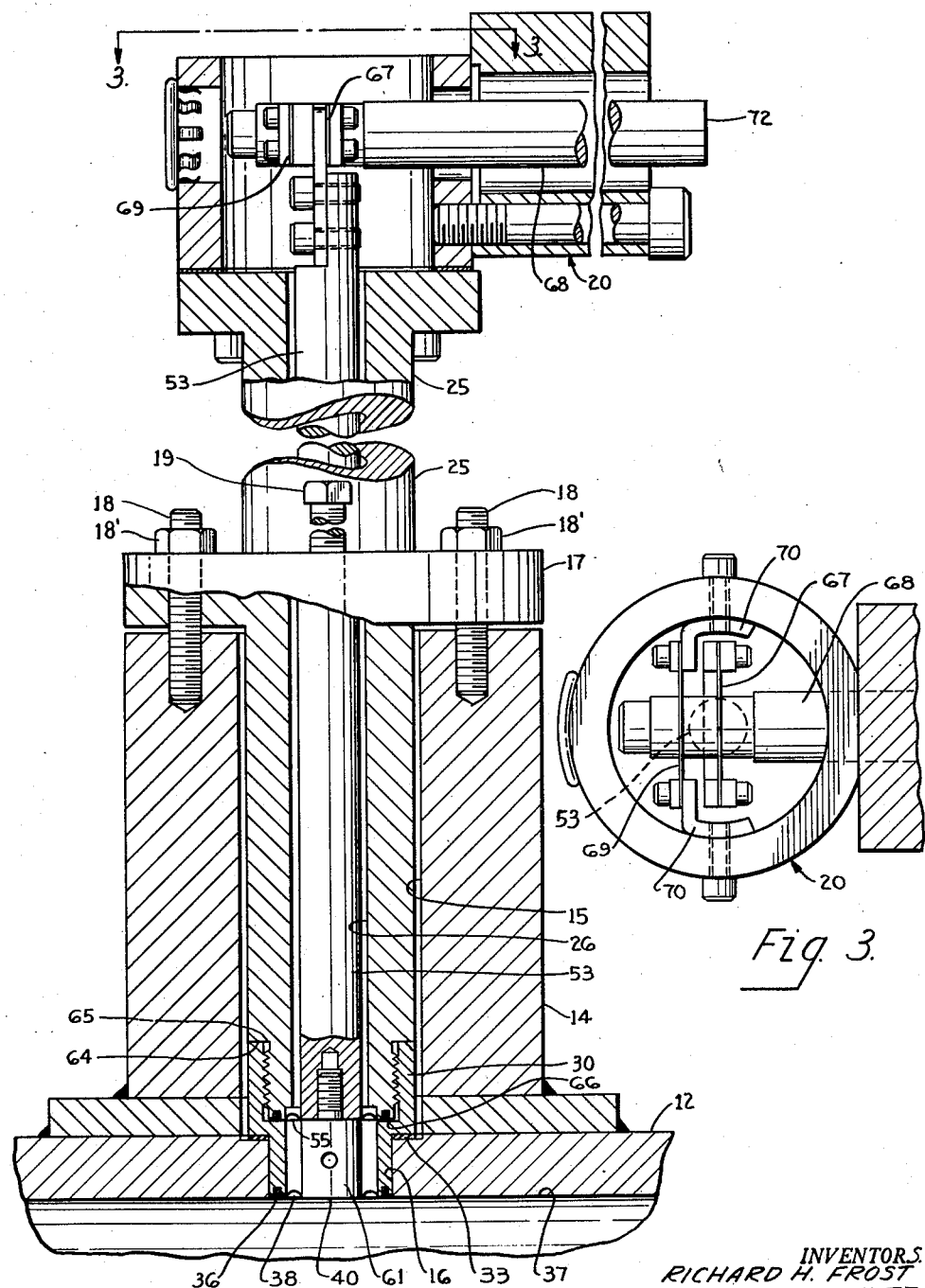

United States Patent Office 2,902,861
Patented Sept. 8, 1959

2,902,861

PRESSURE SENSING DEVICE

Richard H. Frost, Norristown, Pa., and Earl O. Schweitzer, Wickliffe, Ohio, assignors to The Swartwout Company, Cleveland, Ohio, a corporation of Ohio Application March 9, 1955, Serial No. 493,246

2 Claims. (Cl. 73—408)

This invention relates to pressure sensing devices and more particularly to a pressure sensing device with a pressure sensing element in direct contact with the pressure fluid being measured.

Measurement of the pressure of process material at high pressures and temperatures, that is, at or above 0–2500 p.s.i. and 300° C., is difficult to accomplish accurately because of the problem of providing adequate means, capable of withstanding such elevated pressures and temperatures, for carrying pressure sensings from the process material to remote locations to operate suitable transmitters, indicators or control apparatus. Fluid filled tubes disposed to project into the vessel containing the process material have been used for this purpose in the past, the fluid serving to sense and conduct pressure signals to remote apparatus. However, such tubes tend to restrict flow of moving process material and, further, have inherent inaccuracies resulting from expansion and contraction of the fluid under high temperature conditions.

A general object of our invention is the provision of a flush diaphragm pressure sensing device which eliminates the need for auxiliary pressure lines intermediate the process fluid being measured and the instrument or mechanism which functions in response to the measured pressure. Another object is the provision of a completely mechanical frictionless pressure sensing device having no transmission lags. A further object is the provision of a self-contained flush diaphragm pressure sensing device which is easy to install on the vessel or conduit containing the process fluid and which is easily modified for different pressure ranges.

Another object is the provision of a pressure sensing device with a measuring diaphragm and direct contact with the process fluid being measured, the sensings of the diaphragm being carried by mechanical means from the diaphragm to a location remote from the pressure vessel for actuating a mechanism which functions in response to the measured pressure. A more specific object is the provision of novel means for securing a diaphragm on the end of a tube. A further object is the provision of an accurate pressure sensing device for measuring pressure of high temperature fluids, such as molten metal, and which is economical to construct and to maintain.

These and other objects of our invention will become apparent from the following description of a preferred embodiment thereof, reference being had to the accompanying drawings.

Figure 1 is an elevation of a conduit on which a pressure transmitter having a pressure sensing device embodying our invention is mounted.

Figure 2 is an enlarged vertical central section of the pressure sensing device showing the connection of the probe to the conduit and the details of the probe rod linkage and pivots.

Figure 3 is a plan view of the pivotal connection between the probe rod and the link bar, the view being taken on the line 3—3 of Figure 2.

Figure 4 is an enlarged sectional view of the measuring end of the probe rod and casing of Figure 2.

Figure 5 is a greatly enlarged fragmentary section of the diaphragm connection at the end of the probe casing.

Figure 6 is a section similar to Figure 4 showing a modified form of probe end construction.

Figure 7 is a section showing a modified diaphragm construction.

In the practice of our invention, the pressure sensing device has a rigid probe mounted on the wall of a vessel, such as a conduit, in which the high temperature process material whose pressure is to be measured, is contained, the probe extending through the vessel wall and terminating flush with the interior of the vessel. A pressure measuring or sensing diaphragm mounted on the inner flush end of the rigid probe makes direct contact with the process material and detects pressure and changes in pressure of the material. A probe rod is disposed axially within the probe casing, one end of the rod engaging the diaphragm. The opposite end of the rod is pivotally connected by frictionless pivots to a link which actuates suitable pressure transmitting, indicating recording and/or controlling apparatus. The sensing diaphragm thus directly contacts the process material, senses pressure of the material and transmits the pressure sensings mechanically as force signals by the rod and associated linkage to remotely located apparatus which operates in response to those signals.

Referring now to the drawings, a preferred embodiment of our invention is shown in Figure 1 as a probe generally indicated at 10 which is mounted on a conduit 12 through which a process material, such as a polymer, asphalt, slurry, viscous fluid or molten metal is carried. A mounting adapter 14 having a well 15, see Figure 2, in alignment with an opening 16 in the conduit is welded to the outside of the conduit and the probe 10 is secured by integral flange 17 and screws 18 and nuts 18′ to the top of the adapter and extends into the well and conduit opening. Jack screws 19 threaded into the flange and engaging the top of the adapter facilitate removal of the entire probe from the adapter well and conduit opening for inspection and maintenance or for modification of the probe for measurement of different pressure ranges.

The upper end of the probe, as viewed in Figure 1, joins a linkage housing 20 which may be connected opposite the probe by bolts 21 to an enclosure 22 containing, for example, mechanism for amplifying and converting pressure signals generated by the probe in response to process material pressure into electrical signals which are carried by electric output leads 23 to suitable pressure indicating, recording and/or controlling apparatus, not shown. Amplifying and conversion mechanism of the type described and claimed in Schweitzer application Serial No. 376,931 filed August 27, 1953, now abandoned, may be used for this purpose.

The probe 10 comprises a preferably thick walled casing or tube 25, see Figure 2, having a central longitudinal bore 26 extending from end to end of the casing. The lower end of probe casing 25, as viewed in the drawing, comprises an open ended cap 30, see also Figure 4, removably connected as by threads 31 to the end of the main body of the casing and extending downwardly therefrom. The cap 30 has an annular external shoulder 32 which engages a gasket 33 supported on a corresponding shoulder 34 in the wall of the conduit for sealing the connection of the probe in the bottom of the adapter well 15 when the transmitter is assembled. The lower end of the cap 30 extends into the conduit opening 16 with its end face 36 flush with the interior surface 37 of the conduit.

In order to sense pressure of the material in the conduit, a measuring diaphragm 38 is connected across the inner flush face 36 of the cap. The diaphragm is formed from suitable material capable of withstanding extreme temperatures, pressures and corrosive characteristics of the process material to which the diaphragm is exposed, and we have found relatively thin metallic diaphragms in the order of .001″ to .005″ thick and made of stainless steel, Inconel, and the like have given satisfactory results. Diaphragm 38 is generally disk-like in form and is shaped with a concavo-convex annulus 39 between flat central and outer portions 40, 41, respectively.

In order to secure the diaphragm to the end of cap 30, an annular groove 43, see Figure 5, is formed preferably centrally, in cap end face 36. Groove 43 is defined by a cylindrical inner wall surface 45, a bottom surface 46 and an outer wall surface 47 which is cylindrical adjacent the bottom surface 46 and outwardly tapered or bevelled at the outer lip 47a of the groove. The marginal edge portion 41a of the diaphragm is bent around the inner rounded lip 49 of the groove and extends along groove surface 45 for a substantial portion of the depth of the groove. A retainer ring 50 preferably made of the same material as the diaphragm and having a mean diameter equal to the mean diameter of the groove is forced into the groove and tightly presses the marginal lip 41a of the diaphragm against the inner groove surface 45 to securely hold the diaphragm in place.

The diametric thickness of ring 50 preferably is the same as the width of groove 43 and when forced into the groove over the marginal portion of the diaphragm, squeezes the latter with considerable lateral force against the side of the groove, the force exerted being of an order of magnitude to cause the diaphragm to be positively frictionally bonded in tight metal to metal contact with the inner surface of the cap groove. The depth of the groove preferably is slightly larger than the diametric thickness of the retaining ring, and we have found that the ring can be pressed into the groove with modest force to effect a tight clamping action on the marginal portion of the diaphragm in the groove capable of holding the diaphragm in place throughout the range of pressures for which the diaphragm is designed. The bevelled outer lip 47a of the groove relieves the lateral force developed by the ring 50 as it initially enters the groove and prevents shearing of the diaphragm at the inner lip of the groove. In practice we have found that a retaining ring formed of .031″ diameter hard temper wire satisfactorily secures a diaphragm .002″ thick in a groove .031″ in width and .032″ deep.

The central portion 40 of measuring diaphragm 38 moves normal to the conduit opening 16 it covers over a range of approximately .0001″ to .0002″ or less in response to pressures of the process material in the conduit. This movement of the diaphragm is transmitted remote from the conduit by a probe rod 53, the lower end of which, as viewed in the drawings, engages the central portion 40 of the diaphragm. Probe rod 53 is smaller in diameter than bore 26 of the probe casing and, in one form of our invention, is centered within the bore by means of a centering disk or diaphragm 55 closely axially spaced to measuring diaphragm 38 and within the casing bore. Centering diaphragm 55 is tightly clamped between cap 30 and the inner portion of the lower end face 56 of the main body of the probe casing 25 and, if desired, may be secured further by retaining ring 58 pressed against the marginal edges of the diaphragm in an annular groove 59 in face 56, the groove 59 preferably having the same shape as groove 43 in cap end face 36. The central portion of diaphragm 55 is connected to the probe rod and for this purpose the lower end of the rod comprises an extension plug 61 having a threaded stud 62 engageable in a tapped hole in the end of the upper part of the probe rod. Centering diaphragm 55 is secured between the plug and the upper probe rod during assembly of the latter, the annulus 63 of the diaphragm extending unsupported between the probe rod and the casing and permitting limited axial movement of the rod within the casing while restraining it against lateral movement.

The upper, as viewed, end 64 of cap 30 abuts tightly against shoulder 65 on casing 14 when the cap is assembled on the end of the casing body, the inner cap shoulder 66 simultaneously pressing the marginal portion of centering diaphragm tightly against the end face 56 of the casing body. When nuts 18′ are tightened on screws 18 against probe casing flange 17, cap 30 is seated tightly on the gasketed shoulder 34 of the conduit wall and further is pressed axially against the casing body, making the cap rigid with the casing body.

Probe rod 53 extends upwardly through the casing and into housing 20 and is connected by a frictionless spring pivot 67, see Figures 2 and 3, to and near one end of, the left end as viewed in the drawings, a transversely extending link or bar 68 which is supported at its left end by frictionless spring pivot 69 secured by opposite brackets 70 to the side of housing 20, see Figure 3. The pivots 67 and 69 are laterally offset from each other and bar 68 thus is a moment arm fulcrumed at pivot 69 and actuated to rock about the pivot by the action of probe rod 53 applied at pivot 67. Accordingly axial movement of probe rod 53 within the casing causes bar 68 to rock about spring pivot 69, the motion of the probe rod being amplified at the outer end 72 of bar 68 by the ratio of the length of the bar to the spacing of the pivots. Outer end 72 of bar 68 is connected to suitable conversion means for producing electric or pneumatic signals or is connected to directly actuated mechanical indicating means. An example of conversion means of this type is the motion amplifying linkage and differential transformer described in the Schweitzer application mentioned above.

Figure 6 shows a modified form of probe in which the auxiliary centering diaphragm for the probe rod is omitted, the measuring diaphragm being utilized for this purpose. In this form, probe casing 25′ is fitted with an end cap 75 having an internal annular flange 76 circumscribing and closely spaced to probe rod extension 78 which is threaded on the end 79 of the main body of the probe rod 53. The opposite end 80 of extension 78 engages the central conforming part of measuring diaphragm 38′, the concavo-convex annulus 39′ of the diaphragm embracing the end edge of extension 78 and restraining lateral movement of the rod. In order to provide fine adjustment of the effective length of the probe rod 53, the extension 78 is adjustable axially on the threaded end 79 of the probe rod body, tranverse locking pin 81 being insertable in aligned holes 82, 83 in the extension 78 and probe end 79, respectively, to secure the extension in its adjusted position. Annular flange 76 of cap 75 serves as a stop to prevent excessive lateral movement of the probe rod incident to vibrations and jolts experienced in shipment and which might otherwise damage the measuring diaphragm. In event of rupture of the measuring diaphragm during use, flow of the process fluid upwardly through the probe casing is substantially restricted by the narrow clearance 84 between the annular flange 76 and rod extension 78, the clearance being in the order of .004″.

The measuring diaphragm 38′ may be connected to the end of cap 75 by the ring-in-groove connection described above or, if desired, may be secured as by welding 85 to the outer peripheral edge of the cap as shown in Figure 6. In applications calling for an all welded construction, the cap is welded externally to the casing body along a V-shaped annular groove 86. Additionally other connections of the components are likewise welded, for example, at the junction of the flange 17 to the conduit adapter 14 and at the junction of the probe casing to the linkage housing 20.

In order to increase the thickness of the measuring diaphragm, and thus its strength without unduly increasing the stiffness, we have found that two or more diaphragms 88, 89, see Figure 7, disposed in juxtaposition with each other as shown give good results. The stiffness characteristic of the diaphragm increases proportionally with the cube of the diaphragm thickness whereas with the laminated or multi-ply diaphragm construction stiffness increases directly in proportion to the thickness. Thus the laminated construction may be utilized with the flush type pressure transmitter for measuring process materials at elevated pressures without substantial loss of accuracy. For example, a .004" thick, two-ply diaphragm has one-quarter the stiffness of .004" thick single ply diaphragm and has substantially the same strength as the single ply diaphragm.

Our pressure sensing device is particularly well adapted to modification by the user for measuring pressures at different ranges. To accomplish this, the end caps 30 or 75, in non-welded constructions, are removed from the end of the probe casing body and are replaced with an end cap and diaphragm assembly selected for measurement of pressures at the desired pressure range. This feature of our transmitter construction pemits on-location change of the instument by the ultimate user and eliminates shipment of the entire unit to the factory for this purpose.

In the adjustment of our pressure sensing device after assembly, the probe rod 53 is set to engage the central portion of the sensing diaphragm 38 or 38' without imposing any load on the diaphragm. That is to say, the weight of the probe rod is counterbalanced through the spring pivots 67 and 69 and bar 68 by suitable balancing and adjusting mechanism connected to the outer end 72 of the bar so that the end of extension 61 or 78 just engages the sensing diaphragm in its neutral or zero position without axially loading the diaphragm. Any force transmitted to the probe rod as a result of pressure sensed by the diaphragm is thus an accurate measure of pressure in the conduit.

The range of pressures which our device can sense is variable and depends, inter alia, upon the effective area of the sensing diaphragm used. For example, to measure a range of pressures from a minimum of 0-200 p.s.i. to a maximum of 0-1000 p.s.i., a diaphragm having an effective area, that is, the area of the casing cap opening which the diaphragm covers, of approximately .5625 square inch (.75" in diameter) may be used; for a range of 0-1000 p.s.i. minimum to 0-2500 p.s.i. maximum, a diaphragm having an effective area of .1648 square inch (.406" in diameter) is used. Pressures in the order of 6000 p.s.i. have been accurately measured with our sensing device.

It will be apparent that various modifications and changes to and in the above described preferred embodiments of our invention will occur to those skilled in the art without departing from the precepts and scope of our invention and it is to be understood that the above description is given by way of example. The essential characteristics of the invention are summarized in the appended claims.

We claim:
1. A device for sensing pressure in a container having a wall opening comprising an adapter secured to said wall and extending outwardly therefrom and having a well of greater diameter than said opening coaxially aligned with said opening, a probe tube having an external flange secured to said adapter, said tube extending into said well coaxially therewith and having a threaded inner end within said well and a bore coaxial with said well, a cap member secured to said end of said tube and extending into said wall opening, one end of said cap member terminating substantially flush with the interior of said wall adjacent said opening, said cap having a bore extending therethrough and being coaxial with said well and wall opening and in alignment with said bore of said tube, said one end of said cap member having an annular groove therein, a pressure sensitive diaphragm having its marginal edge disposed in said groove and overlying and closing said bore of said cap member and being substantially flush with said interior of said wall adjacent said opening, a retainer ring in said groove for retaining the edge of said diaphragm therein, a probe rod disposed and adapted for reciprocal motion within said bores and comprising a main part one end of which terminates in substantially the same plane as said end of said probe tube and an extension part secured to said main part and engaging said diaphragm, said extension part being axially adjustable relative to said main part to vary the effective length of said rod, and a centering disc having its marginal edge secured to said end of said probe tube between said end of said tube and said cap and extending between said main and extension parts of said rod, said disc having an annulus defining a seat for said main part of said rod and restraining said rod against lateral movement within said probe tube.

2. A device for sensing pressure in a container having a wall opening comprising an adapter secured to said wall and extending outwardly therefrom and having a well of greater diameter than said opening coaxially aligned with said opening, a probe tube having an external flange secured to said adapter, said tube extending into said well coaxially therewith and having a threaded inner end within said well and a bore coaxial with said well, a cap member secured to said end of said tube and extending into said wall opening, one end of said cap member having an annular part terminating substantially flush with the interior of said wall adjacent said opening, said cap having a bore extending therethrough and being coaxial with said well and wall opening and in alignment with said bore of said tube, a pressure sensitive diaphragm having its marginal edge in fluid tight engagement with said annular part and overlying and closing said bore of said cap member and being substantially flush with said interior of said wall adjacent said opening, a probe rod disposed and adapted for reciprocal motion within said bores and comprising a main part one end of which terminates in substantially the same plane as said end of said probe tube, and an extension part secured to said main part and engaging said diaphragm, and a centering disc having its marginal edge secured to said end of said probe tube between said end of said tube and said cap and extending between said main and extension parts of said rod, said disc having an annulus defining a seat for said main part of said rod and restraining said rod against lateral movement within said probe tube.

References Cited in the file of this patent
UNITED STATES PATENTS

| | | |
|---|---|---|
| 278,909 | Emery | June 5, 1883 |
| 278,910 | Emery | June 5, 1883 |
| 1,393,446 | Jacobus | Oct. 11, 1921 |
| 1,479,733 | Quinn | Jan. 1, 1924 |
| 2,472,045 | Gibbons | May 31, 1949 |
| 2,715,336 | Schaus | Aug. 16, 1955 |

FOREIGN PATENTS

| | | |
|---|---|---|
| 606,954 | Germany | Dec. 14, 1934 |
| 688,097 | Germany | Feb. 12, 1940 |
| 916,664 | France | Aug. 26, 1946 |
| 900,895 | Germany | Feb. 1, 1954 |